US008515287B2

(12) United States Patent
Ogawa et al.

(10) Patent No.: US 8,515,287 B2
(45) Date of Patent: Aug. 20, 2013

(54) OPTICAL TRANSMISSION EQUIPMENT AND METHOD FOR CONTROLLING THEREOF

(75) Inventors: Kenichi Ogawa, Yokohama (JP); Kazuhiro Watanabe, Hayama (JP); Hiroyuki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1106 days.

(21) Appl. No.: 12/136,155

(22) Filed: Jun. 10, 2008

(65) Prior Publication Data

US 2008/0310855 A1    Dec. 18, 2008

(30) Foreign Application Priority Data

Jun. 13, 2007   (JP) ................................. 2007-156698

(51) Int. Cl.
*H04J 14/02* (2006.01)
*H04B 10/00* (2006.01)
*H04B 10/12* (2006.01)
*H04B 10/06* (2006.01)

(52) U.S. Cl.
USPC ............. 398/159; 398/81; 398/136; 398/147; 398/158; 398/160; 398/161; 398/162; 398/208; 398/209

(58) Field of Classification Search
None
See application file for complete search history.

(56) References Cited

U.S. PATENT DOCUMENTS

| 4,027,888 | A | 6/1977 | Wilcox |
| 4,179,158 | A | 12/1979 | Flaum et al. |
| 4,875,732 | A | 10/1989 | Miller |
| 6,266,170 | B1 * | 7/2001 | Fee ............................... 398/147 |
| 7,008,020 | B2 | 3/2006 | Becker et al. |
| 2003/0223760 | A1 * | 12/2003 | Takahara et al. .............. 398/147 |

FOREIGN PATENT DOCUMENTS

| JP | 2002-57622 | 2/2002 |
| JP | 2003-258726 | 9/2003 |

* cited by examiner

*Primary Examiner* — Kenneth N Vanderpuye
*Assistant Examiner* — Darren E Wolf
(74) *Attorney, Agent, or Firm* — Antonelli, Terry, Stout & Kraus, LLP.

(57) ABSTRACT

The optical transmission equipment includes: a demultiplexer for demultiplexing a transmitted wavelength-multiplexed optical signal to first and second optical signals; a first variable dispersion compensation unit; a second variable dispersion compensation unit; a first error detector; a second error detector; and a dispersion compensation control unit for controlling dispersion compensation amounts of the first and second variable dispersion compensation units based on the detection result of the first or second error detector. Upon detection of a signal error in the first optical signal, the first variable dispersion compensation unit is controlled to change from a first compensation amount to a third compensation amount, and the second variable dispersion compensation unit is controlled to change from a second compensation amount to a fourth compensation amount.

3 Claims, 8 Drawing Sheets

OPTICAL TRANSMISSION EQUIPMENT AND METHOD FOR CONTROLLING THEREOF

CLAIM OF PRIORITY

The present application claims priority from Japanese patent application serial no. 2007-156698, filed on Jun. 13, 2007, the content of which is hereby incorporated by reference into this application.

BACKGROUND OF THE INVENTION

The present invention relates to optical transmission equipment and a method for controlling the optical transmission equipment. More particularly, the present invention relates to optical transmission equipment for an optical transmission system for multiplexing and transmitting plural signal lights, and to a method for controlling the optical transmission equipment.

As a dispersion compensation method, there is a control method for reducing signal errors. This method changes the dispersion value by a variable dispersion compensator when a signal error occurs due to dispersion changes resulting from the change in the transmission line characteristics or other factors. In this way, the method controls the dispersion value to fall within the dispersion tolerance range of an optical receiver.

JP-A 2003-258726 describes an optical receiving apparatus for detecting an uncorrected error in a code error correction circuit in the change of the transmission line dispersion, and controlling the amount of dispersion of a variable dispersion compensator upon detection of an uncorrected error.

However, according to JP-A 2003-258726, since the control is performed upon occurrence of the signal error, the dispersion tolerance remains reduced for other receivers in which no signal error occurs. As a result, there is no consideration of reducing the rate of further occurrence of errors in the change of the transmission line dispersion.

SUMMARY OF THE INVENTION

The present invention provides optical transmission equipment in which not only an optical receiver in which an error is detected, but also an optical receiver in which no error is detected controls a dispersion compensator to approximate the dispersion value to the median of the dispersion tolerance range of the optical receiver.

The above described problem can be solved by optical transmission equipment including: a wavelength demultiplexer for demultiplexing a transmitted wavelength-multiplexed signal to a first optical signal of a first wavelength and to a second optical signal of a second wavelength; a first variable dispersion compensation unit for compensating the dispersion of the first optical signal; a second variable dispersion compensation unit for compensating the dispersion of the second optical signal; a first error detector for detecting a signal error in the first optical signal which has been subjected to dispersion compensation; a second detector for detecting a signal error in the second optical signal which has been subjected to dispersion compensation; and a dispersion compensation control unit connected to the first variable dispersion compensation unit, the second variable dispersion compensation unit, the first error detector, and the second error detector. The dispersion compensation control unit controls dispersion compensation amounts of the first and second variable dispersion compensation units, based on the detection result of the first or second error detector. Upon detection of a signal error in the first optical signal, the first variable dispersion compensation unit is controlled to change from a first compensation amount to a third compensation amount, and the second variable dispersion compensator is also controlled to change from a second compensation amount to a fourth compensation amount.

Further, the above described problem can be solved by a method for controlling optical transmission equipment, including the steps of: demultiplexing a transmitted wavelength-multiplexed optical signal to a first optical signal of a first wavelength and to a second optical signal of a second wavelength; dispersion compensating the wavelength-demultiplexed first and second optical signals; detecting signal errors in the dispersion-compensated first and second optical signals; and upon detection of a signal error in the first optical signal, changing a first compensation amount for the first optical signal to a third compensation amount, and changing a second compensation amount for the second optical signal to a fourth compensation amount.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
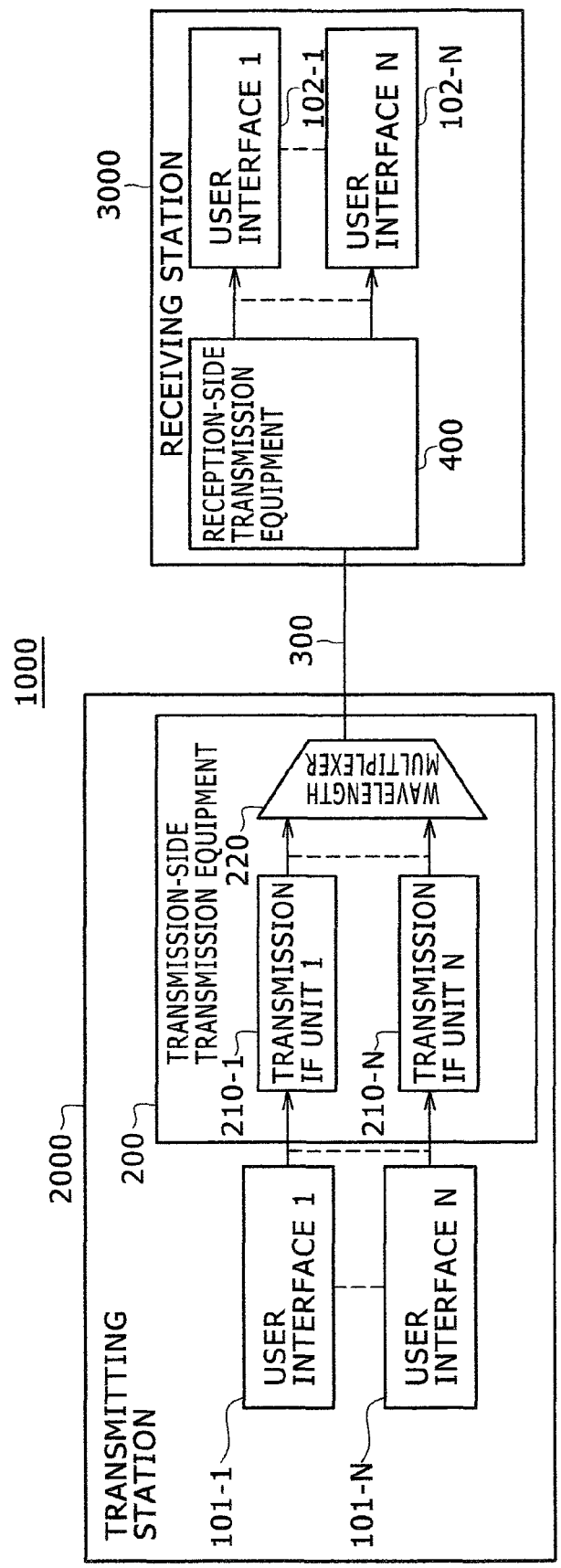
FIG. 1 is a block diagram of an optical transmission system.

Hereinafter, preferred embodiments of the present invention will be described with reference to the accompanying drawings. Like or corresponding parts are denoted by the same reference numerals and the description is not repeated.

Figure 2:
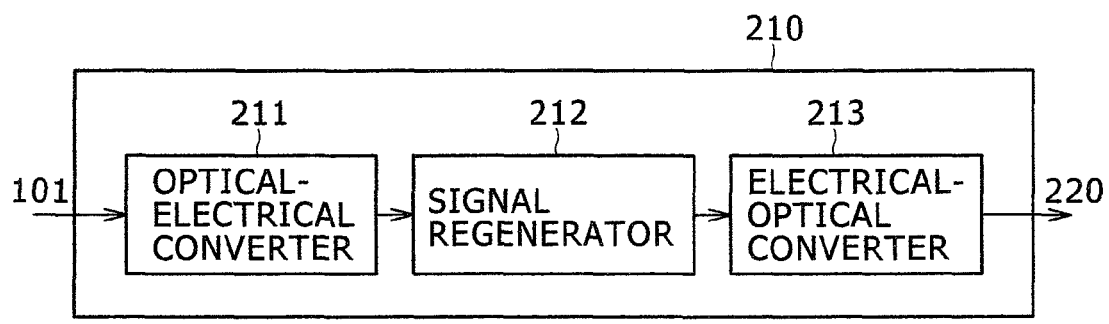
FIG. 2 is a block diagram of a transmission IF unit.
Figure 3:
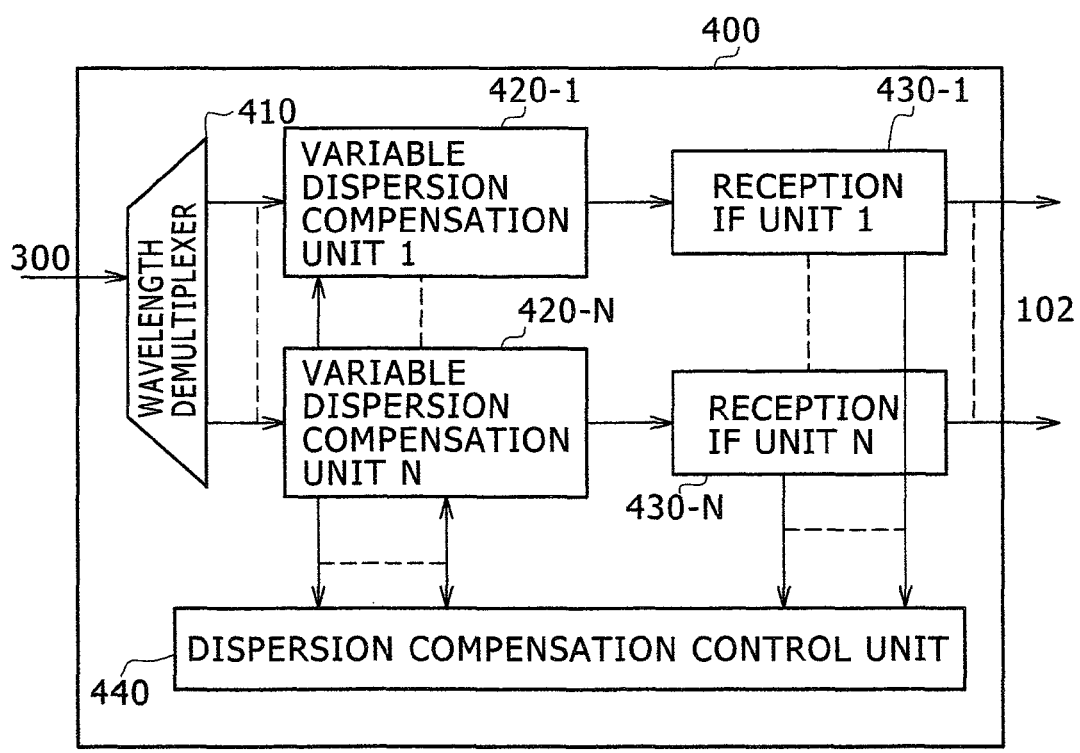
FIG. 3 is a block diagram of a reception-side transmitter.
Figure 4:
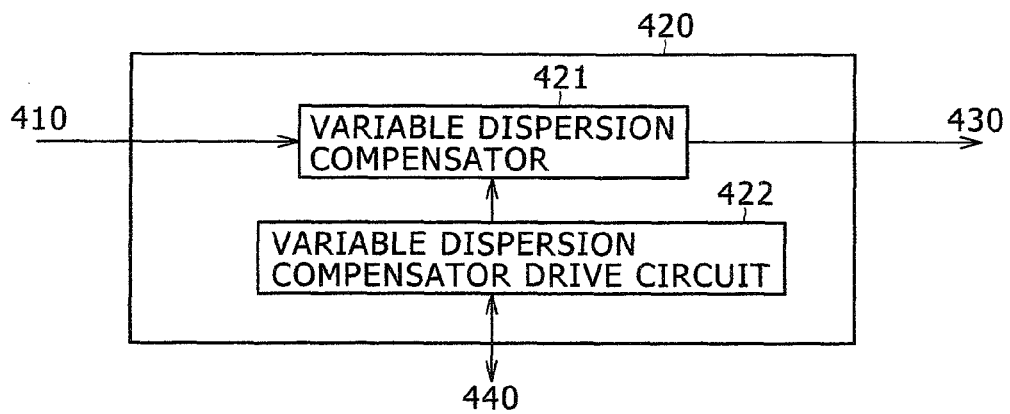
FIG. 4 is a block diagram of a variable dispersion compensation unit.
Figure 5:
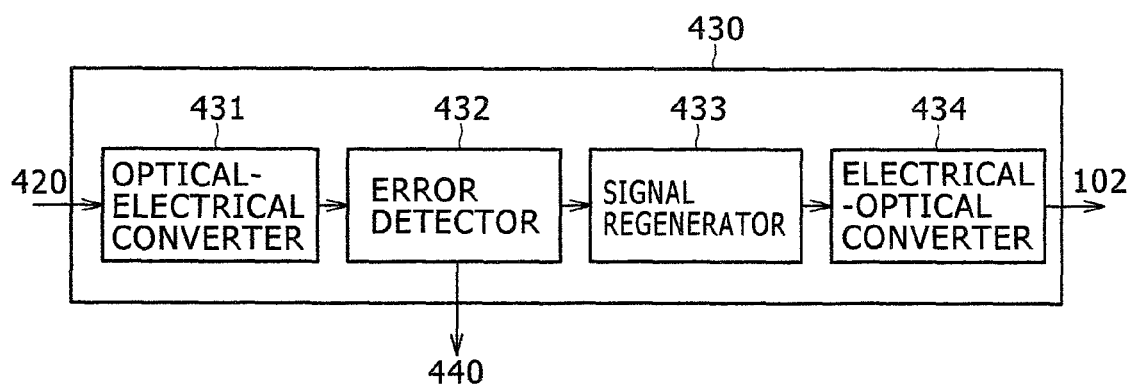
FIG. 5 is a block diagram of a reception IF unit.
Figure 6:
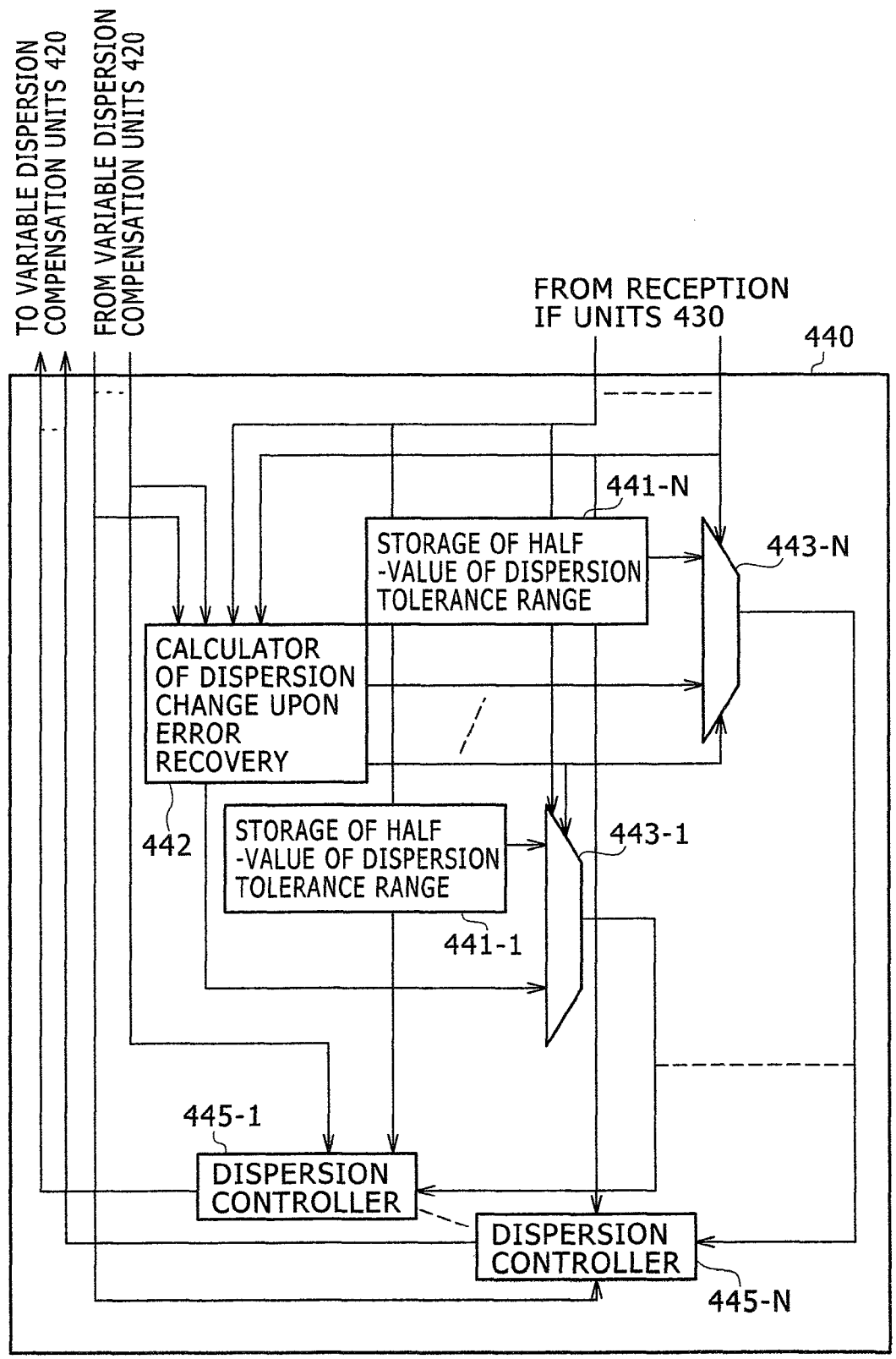
FIG. 6 is a block diagram of a dispersion compensation control unit.
Figure 7:
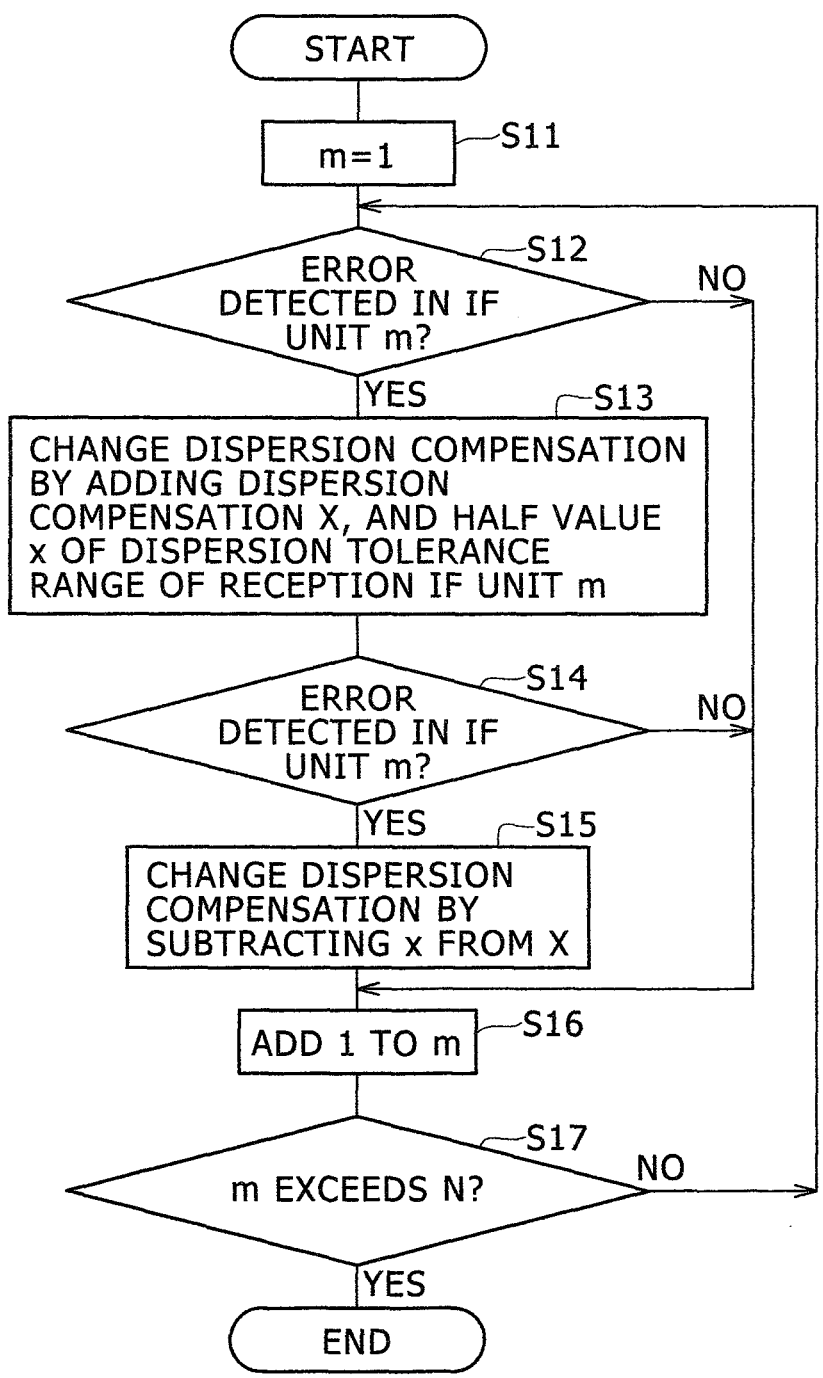
FIG. 7 is a flowchart illustrating error detection control in the reception-side transmitter.
Figure 8:
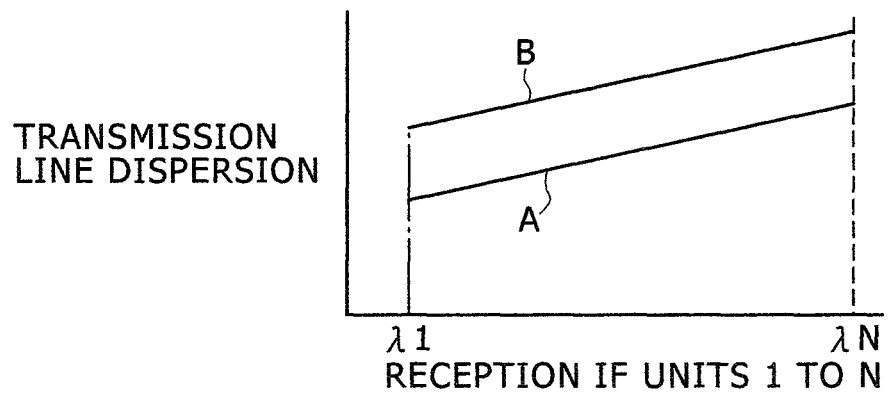
FIG. 8 is a view showing changes in the transmission line dispersion value.
Figure 9:
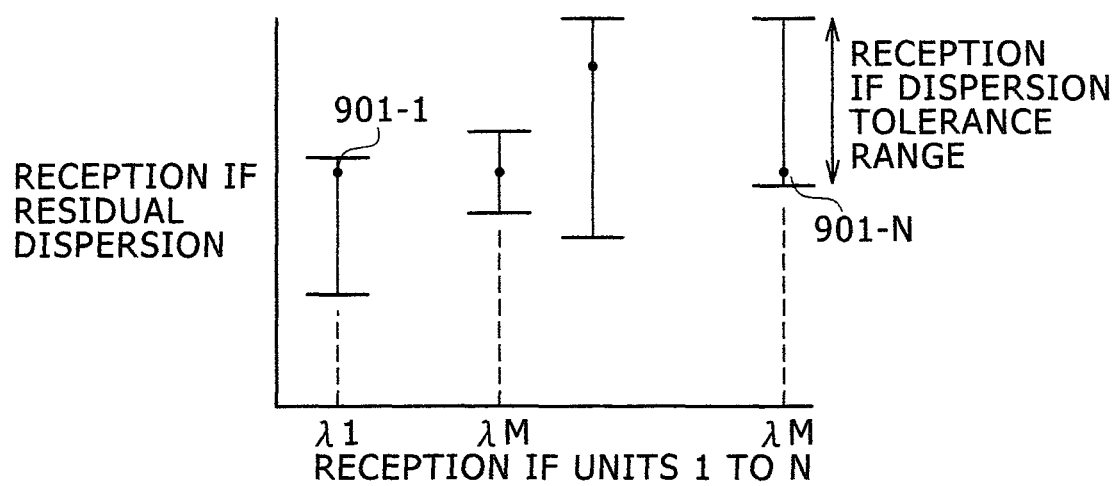
FIG. 9 is a view showing residual dispersion values and dispersion tolerances.
Figure 10:
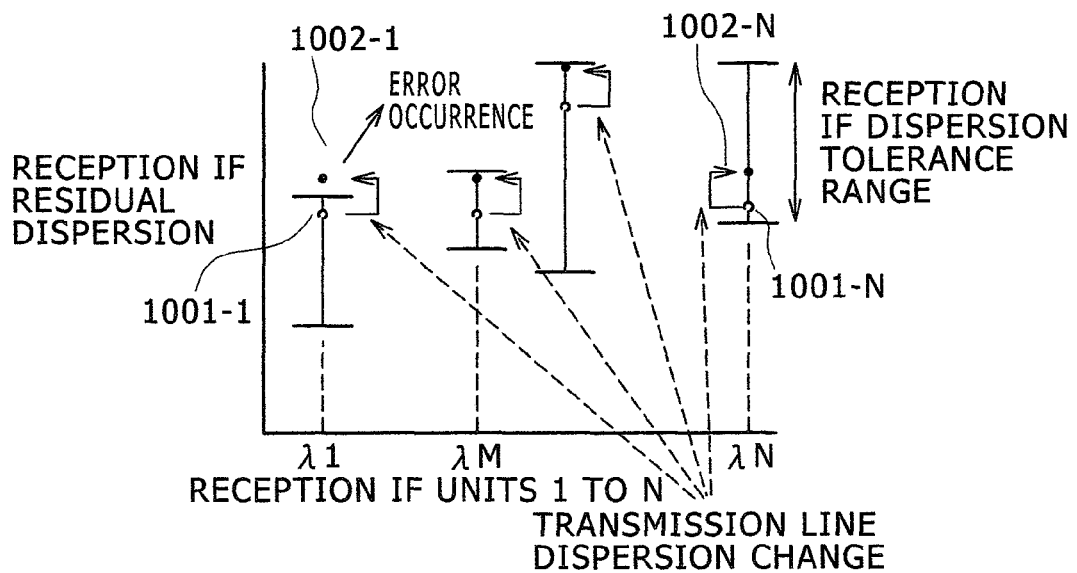
FIG. 10 is a view showing residual dispersion values and dispersion tolerances upon occurrence of an error.
Figure 11:
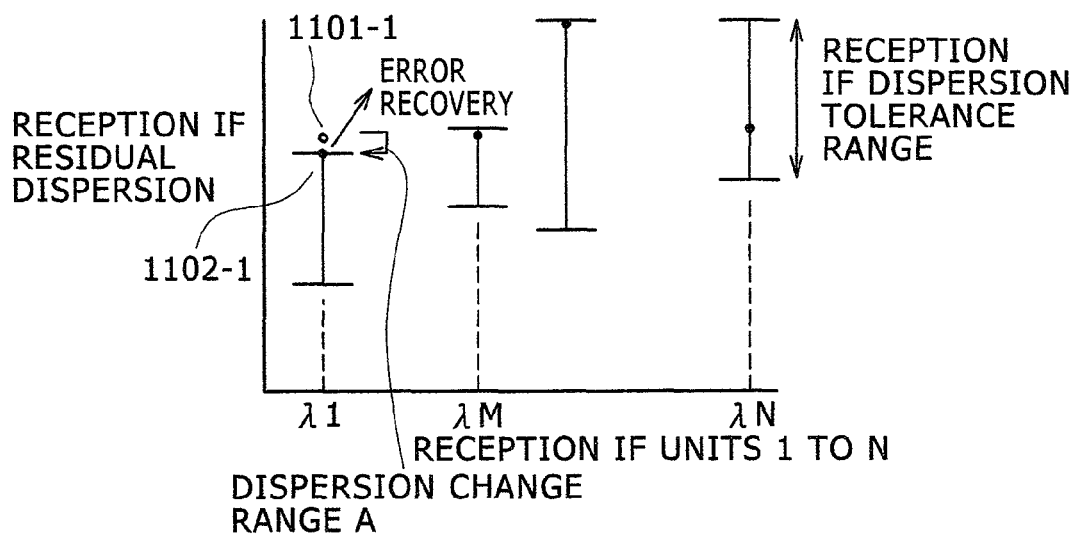
FIG. 11 is a view showing residual dispersion values and dispersion tolerances immediately after recovery from the error.
Figure 12:
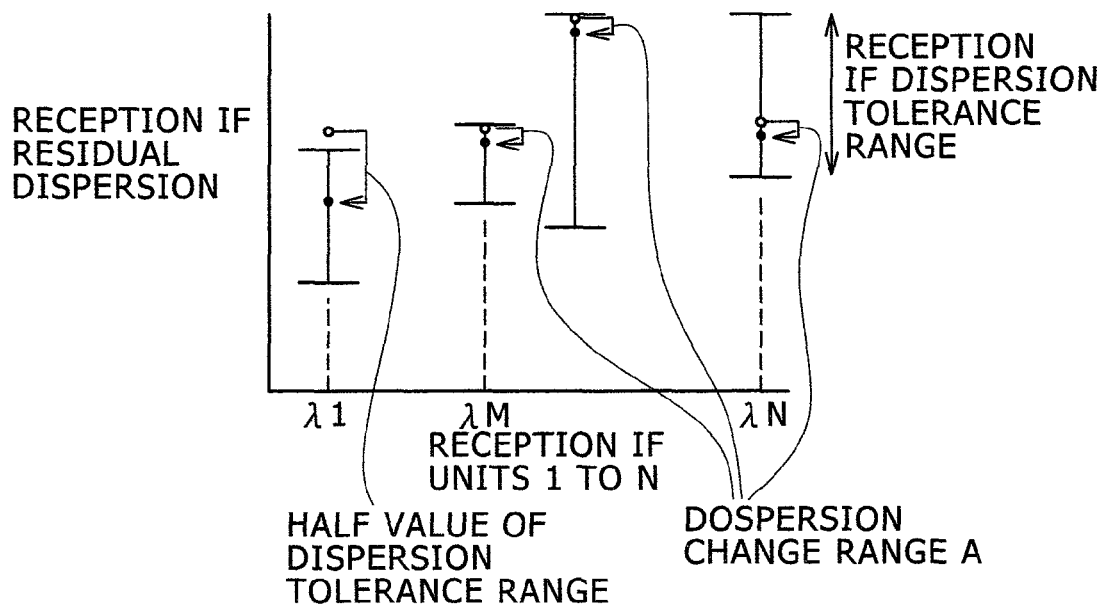
FIG. 12 is a view showing residual dispersion values and dispersion tolerances when all variable dispersion compensation units are controlled.

Here, FIG. 1 is a block diagram of an optical transmission system. FIG. 2 is a block diagram of a transmission IF unit. FIG. 3 is a block diagram of a reception-side transmitter. FIG. 4 is a block diagram of a variable dispersion compensation unit. FIG. 5 is a block diagram of a reception IF unit. FIG. 6 is a block diagram of a dispersion compensation control unit. FIG. 7 is flowchart illustrating error detection control of the reception-side transmitter. FIG. 8 is a view showing changes in the transmission line dispersion value. FIG. 9 is a view showing residual dispersion values and dispersion tolerances. FIG. 10 is a view showing residual dispersion values and dispersion tolerances upon occurrence of an error. FIG. 11 is a view showing residual dispersion values and dispersion tolerances immediately after recovery from the error. FIG. 12 is a view showing the residual dispersion values and the dispersion tolerances when all variable dispersion compensation units are controlled.

In FIG. 1, an optical transmission system 1000 includes a transmitting station 2000, a receiving station 3000, and an optical fiber 300 for connecting the two stations. The transmitting station 2000 includes plural user interfaces 101, and a transmission-side transmission equipment 200 connected to the plural user interfaces 101. The user interfaces 101 input optical signals to transmission IF units 210 of the transmission-side transmission equipment 200. The transmission-side transmission equipment 200 wavelength converts the optical signals input to the transmission IF units 210. Then a wavelength multiplexer 220 multiplexes the optical signals, and transmits to a reception-side transmission equipment 400 within the receiving station 3000 through the transmission optical fiber 300. The reception-side transmission equipment 400 transmits demultiplexed optical signals to user interfaces 102. The user interfaces 102 receive the optical signals.

In FIG. 2, the transmission IF unit 210 includes an optical-electrical converter 211, a signal regenerator 212, and an electrical-optical converter 213. The optical-electrical converter 211 converts the optical signal from the user interface 101 to an electric signal, and transmits to the signal regenerator 212. The signal regenerator 212 regenerates the electric signal from the optical-electrical converter 211, and transmits to the electrical-optical converter 213. The electrical-optical converter 213 converts the signal from the signal regenerator 212 into an optical signal of a suitable wavelength for multiplexing, and transmits to the wavelength multiplexer 220.

In FIG. 3, the multiplexed optical signal from the transmission line 300 is input to a wavelength demultiplexer 410 of the reception-side transmission equipment 400. The wavelength demultiplexer 410 demultiplexes the input signal into individual wavelengths, and transmits the optical signals to variable dispersion compensation units 420. Upon receiving the optical signals from the wavelength demultiplexer 410, the variable dispersion compensation units 420 compensate the dispersion of the optical signals, respectively, based on a dispersion amount instruction from a dispersion compensation control unit 440. Then, the variable dispersion compensation units 420 transmit the dispersion compensated optical signals to reception IF units 430, respectively. The reception IF units 430 receive the optical signals which have been subjected to dispersion compensation by the variable dispersion compensation units 420, and transmit the signals to the user interfaces 102, respectively.

The dispersion compensation control unit 440 determines the dispersion amount in response to an error detection signal received from the reception IF unit 430. Then, the dispersion compensation control unit 440 instructs the dispersion control amount to the variable dispersion compensation units 420.

In FIG. 4, the optical signal from the wavelength demultiplexer 410 is input to a variable dispersion compensator 421 of the variable dispersion compensation unit 420. The variable dispersion compensator 421 performs dispersion compensation based on the control of a variable dispersion compensator drive circuit 422, and transmits the dispersion compensated optical signal to the reception IF unit 430. The variable dispersion compensator drive circuit 422 controls the dispersion compensation value of the variable dispersion compensator 421, based on the instruction from the dispersion compensation control unit 440. At the same time, the variable dispersion compensator drive circuit 422 notifies the dispersion compensation control unit 440 of the current dispersion compensation value.

In FIG. 5, the optical signal from the variable dispersion compensation unit 420 is input to an optical-electrical converter 431 of the reception IF unit 430. The optical-electrical converter 431 converts the input optical signal to an electric signal, and transmits the electric signal to an error detector 432. The error detector 432 detects the presence or absence of an error in the electric signal from the optical-electrical converter 431. At the same time, the error detector 432 transmits the signal to a signal regenerator 433. Upon detection of an error, the error detector 432 notifies the dispersion compensation control unit 440 of the error detection. When the error is recovered, the error detector 432 notifies the dispersion compensation control unit 440 of the error recovery.

The signal regenerator 433 regenerates the electric signal from the error detector 432, and transmits to an electrical-optical converter 434. The electrical-optical converter 434 converts the electric signal from the signal regenerator 433 into an optical signal, and transmits to the user interface 102.

In FIG. 6, the dispersion compensation control unit 440 includes: a storage 441 of the half value of the dispersion tolerance range in which the reception IF unit 430 can receive without error; a calculator 422 of the dispersion change range when the error is recovered in the reception IF unit; a selector 443 for selecting the dispersion control value between the half value of the dispersion tolerance range and the dispersion change range upon error recovery; and a dispersion controller 445 for controlling the dispersion of the variable dispersion compensation unit, based on the current dispersion amount of the variable dispersion compensation unit 420 and on the dispersion control value. Incidentally, there are N sets of the storage 441 of the half value of the dispersion tolerance range, the selector 443, and the dispersion controller 445, each set corresponding to each reception IF unit. It is to be noted that the dispersion tolerance range is measured for each reception IF unit 430 in advance, and that the half value of the predetermined dispersion tolerance range is held in the storage 441.

The dispersion compensation control unit 440 receives an error signal from one reception IF unit 430-$m$ ($1 \leq m \leq N$). Then the dispersion compensation control unit 440 transmits the error signal to a selector 443-$m$ corresponding to the reception IF unit 430-$m$ in which the error was detected. Upon notification of the error, the selector 443-$m$ determines the half value of the dispersion tolerance range of the reception IF unit 430-$m$ as the control amount, and transmits the control amount to a dispersion controller 445-$m$. Upon reception of the control amount, the dispersion controller 445-$m$ performs control in accordance with a control target value determined by adding the control value to the uncontrolled dispersion amount of the variable dispersion compensation unit. When there is no improvement in the error after control of the dispersion amount, the dispersion controller 445-$m$ determines a control target value by subtracting the control value from the uncontrolled dispersion amount. Then, the dispersion controller 445-$m$ notifies the variable dispersion compensation unit 420-$m$ to change the dispersion compensation amount. Incidentally, the dispersion compensation amount is gradually changed.

When the error is recovered, the dispersion change range calculator 442 calculates a change in the dispersion control amount, from the occurrence of error to the recovery from error, based on the change in the dispersion compensation value of the variable dispersion compensation unit 420-$m$, and based on an error recovery notification from the reception IF 430-*m*. The control value is calculated by subtracting the dispersion value of the reception IF unit 430-*m* in which the error was detected, from the dispersion value of the relevant reception IF unit 430-*m* upon notification of the error recovery.

After the calculation of the change in the dispersion control amount from the occurrence of error to the recovery from error, (N−1) selectors 443-*k* (1≦k≦N, k≠m) corresponding to the reception IF units other than the reception IF unit in which the error occurred, transmit the calculated value as the control amount to the dispersion controllers 445-*k*, respectively. Upon reception of the control amount, each of the dispersion controllers 445-*k* performs control in accordance with a control target value determined by adding the control value to the uncontrolled dispersion value of each of the variable dispersion compensation units 420-*k*.

Referring to FIG. 7, a description will be made on the control of the variable dispersion compensation unit corresponding to the reception IF unit in which the error was detected, of the controls described above. In FIG. 7, the reception-side transmission equipment 400 first sets a parameter m to "1" (S11). The reception-side transmission equipment 400 determines whether an error is detected in the reception IF unit 430-*m* (S12). When YES, the reception-side transmission equipment 400 controls the dispersion compensation control unit 440 to change the dispersion compensation amount by adding a dispersion compensation amount X corresponding to the reception IF unit 430-*m*, and a half value x of the dispersion tolerance range corresponding to the reception IF unit 430-*m* (S13).

The reception-side transmission equipment 400 determines again whether an error is detected in the reception IF unit 430-*m* (S14). When YES, the reception-side transmission equipment 400 controls the dispersion compensation control unit 440 to change the dispersion compensation amount by subtracting the half value x of the dispersion tolerance range corresponding to the reception IF unit 430-*m*, from the dispersion compensation amount X corresponding to the reception IF unit 430-*m* (S15).

The reception-side transmission equipment 400 increments the parameter m (S16), and determines whether m exceeds N (S17). When YES, the reception-side transmission equipment 400 ends the error detection process. When NO in Step 17, the reception-side transmission equipment 400 returns to Step 12. When NO in Step 12 or Step 14, the reception-side transmission equipment 400 moves to Step 16.

With the controls described above, the error detected in the reception IF unit 430-*m* is recovered, and the dispersion values of the reception IF units 430-*k* in which no error is detected are changed. This sequence will be described with reference to FIGS. 8 to 12.

In FIG. 8, the ordinate represents the transmission line dispersion value, and the abscissa represents the wavelength. Line A is the initial dispersion characteristics of the transmission line at λ1 to λN. Line B is the changed dispersion characteristics of the transmission line. FIG. 8 shows the dispersion characteristics of the transmission line that change in a direction in which the absolute value of the transmission line dispersion increases at a constant inclination to the wavelength. However, the dispersion characteristics of the transmission line may change in the reverse direction.

In FIG. 9, the ordinate represents the reception IF residual dispersion value, and the abscissa represents the wavelength. FIG. 9 is a view showing dispersion tolerance ranges of the reception IF units, and residual dispersion values of the reception IF units at different wavelengths. The reception wavelength is a value fixed for each reception IF unit 430, corresponding to the reception IF unit 430 on a one-to-one basis. Residual dispersion values 901 in FIG. 9 are the residual dispersion values in the reception IF units 430, which have been subjected to dispersion compensation by the variable dispersion compensation units 420, respectively. The reception IF dispersion tolerance range indicated by the error bars is a range in which no error occurs. The residual dispersion value 901 is different for each reception IF unit 430, and set within the reception IF dispersion tolerance range upon installation of the equipment. Incidentally, the reception IF dispersion tolerance range depends on the characteristics of the elements constituting the reception IF unit 430. Thus, the mean and range values are different among the reception IF units 430.

Referring to FIG. 10, a description will be given to the reception IF residual dispersion values when the dispersion characteristics of the transmission line change from the line A to the line B as shown in FIG. 8. In FIG. 10, the ordinate represents the reception IF residual dispersion value, the abscissa the wavelength. In FIG. 10, dotted white circles 1001 indicate the residual dispersion values of the reception IF units with the transmission line dispersion characteristics shown by the line A. Black circles 1002 indicate the reception IF residual dispersion values with the transmission line dispersion characteristics shown by the line B. Here, a black circle 1002-1, which is the reception IF residual dispersion value at λ1, is out of the reception IF dispersion tolerance range. Thus an error occurs at λ1. Incidentally, the residual dispersion values also change at the wavelengths of λ2 to λN, but remain within the respective dispersion tolerance ranges, so that no error occurs.

Referring to FIG. 11, a description will be given to the reception IF residual dispersion values, immediately after recovery from the error by controlling the variable dispersion compensation unit 420-1 corresponding to the reception IF unit 430-1 in which the error was detected, following the state shown in FIG. 10. In FIG. 11, a solid white circle 1101 indicates the reception IF residual dispersion value upon detection of the error, and a black circle 1102 indicates the reception IF residual dispersion value immediately after recovery from the error. At this time, a dispersion change range A is determined by subtracting the value of the black circuit 1102-1 from the value of the white circle 1101-1 indicating the reception IF residual dispersion value of the reception IF unit 430-1 in which the error was detected.

Referring to FIG. 12, a description will be given to the dispersion control amount of the reception IF unit in which the error was detected, and to the dispersion control amount of the reception IF units in which no error is detected, following the state shown in FIG. 11. In FIG. 12, the reception IF unit 430-1 in which the error was detected, performs control to approximate the reception IF residual dispersion value to the median value of the reception IF dispersion tolerance range, by changing the dispersion amount of one-half of the dispersion tolerance range by the variable dispersion compensation unit 420-1. While each of the reception IF units 430-N in which no error is detected, performs control to make the reception IF residual dispersion value closer to the median value of the reception IF dispersion tolerance range, by changing the dispersion value by the dispersion change range A. This makes it possible to prevent further occurrence of errors by approximating the residual dispersion value of each of the reception IF units in which no error is detected, to the median value of the reception IF residual dispersion tolerance range, even upon detection of an error in the reception IF unit 430-1.

Incidentally, in the above described embodiment, the control is performed based on the reception IF unit in which an error is detected. However, when the lowest performance reception IF unit is determined in advance, it is possible to perform the control based on an error of the predetermined reception IF unit.

Figure 13:
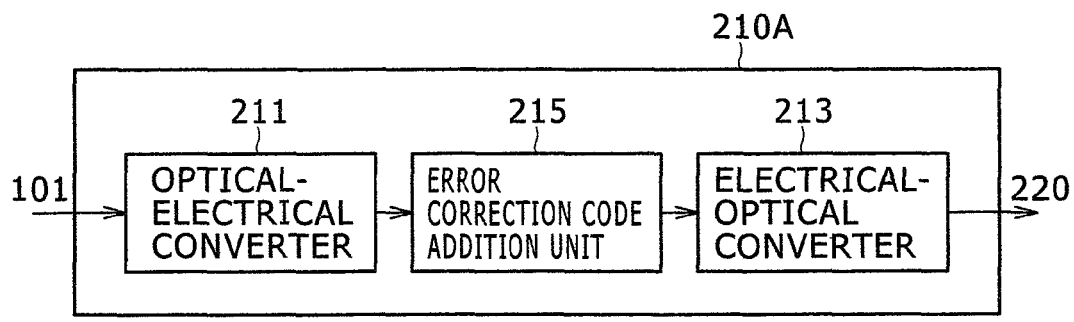
FIG. 13 is a block diagram of a transmission IF unit.
Figure 14:
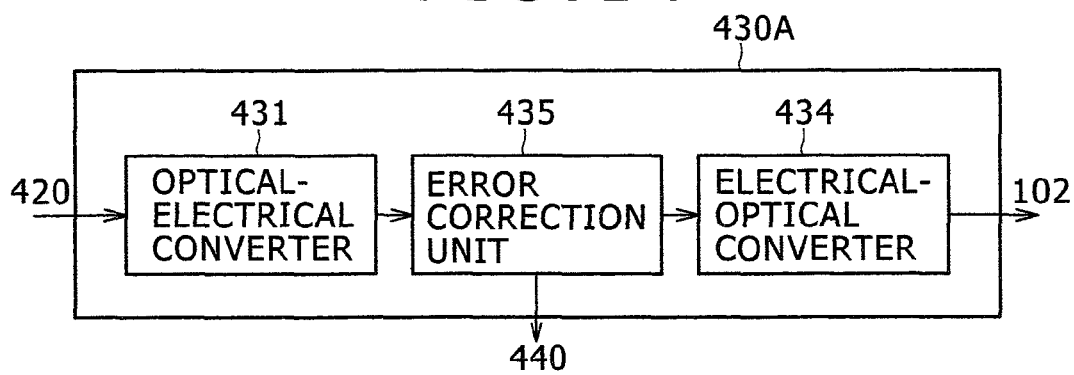
FIG. 14 is a block diagram of a reception IF unit.

Further, in the above described embodiment, there is no error correction unit. However, the same control as described above can be performed also with an error correction unit. This will be described with reference to FIGS. 13 and 14. Here, FIG. 13 is a block diagram of a transmission IF unit. FIG. 14 is a block diagram of a reception IF unit.

In FIG. 13, a transmission IF unit 210A includes an optical-electrical converter 211, an error correction code addition unit 215, and an electrical-optical converter 213. The optical-electrical converter 211 converts an optical signal from the user interface 101 to an electric signal, and transmits to the correction code addition unit 215. The error correction code addition unit 215 reproduces the electric signal from the optical-electrical converter 211, and calculates a forward error correction (FEC) code. The error correction code addition unit 215 adds an error correction code signal to the reproduced electric signal, and transmits to the electrical-optical converter 213. The electrical-optical converter 213 converts the signal from the correction code addition unit 215 into an optical signal of a suitable wavelength for multiplexing. Then, the electrical-optical converter 213 transmits the optical signal to the wavelength multiplexer 220.

In FIG. 14, the optical signal from the variable dispersion compensation unit 420 is input to an optical-electrical converter 431 of a reception IF unit 430A. The optical-electrical converter 431 converts the input optical signal into an electric signal, and transmits the electric signal to an error correction unit 435. The error correction unit 435 reproduces the optical signal from the optical-electrical converter 431. When a code error exists, the error correction unit 435 corrects the error by means of an error correction code. The error correction unit 435 deletes the error correction code, and transmits the corrected electric signal to an electrical-optical converter 434. Further, upon detection of the error, the error correction unit 435 notifies the dispersion compensation control unit 440 of the error detection. When the error is recovered, the error correction unit 435 notifies the dispersion compensation control unit 440 of the error recovery. The electrical-optical converter 434 converts the electric signal from the signal regenerator 433 into an optical signal, and transmits the optical signal to the user interface 102.

According to the above described embodiment, there is an advantage in that an additional error occurring during transmission can be corrected within the transmission system.

Recently in the field of optical transmission systems, demand for access systems has increased, leading to the necessity for high-speed high-capacity transmission equipment. Thus, there is a need to develop transmission equipment with increased transmission speed per wavelength. However, the dispersion tolerance range of a receiver is reduced as the speed is increased, and the change of the transmission line dispersion is no longer negligible. Thus, there is a need to develop an optical transmission system using a variable dispersion compensator. Meanwhile, demand for reliability of the transmission equipment has also increased. The present function enables highly reliable transmission by controlling the dispersion compensation values before error occurs. Consequently, the present function will be an important function for future high-speed high-capacity transmission equipment.

According to the present invention, it is possible to provide optical transmission equipment capable of reducing the rate of occurrence of error due to the change of the transmission line dispersion, even in optical receivers in which no error occurs in the change of the transmission line dispersion, as well as a method for controlling the optical transmission equipment.

What is claimed is:

1. Optical transmission equipment comprising:
    a wavelength demultiplexer for demultiplexing a transmitted wavelength-multiplexed signal at least to a first optical signal of a first wavelength and to a second optical signal of a second wavelength;
    a first variable dispersion compensation unit for compensating transmission
line dispersion of the first optical signal;
    a second variable dispersion compensation unit for compensating transmission line dispersion of the second optical signal;
    a first optical-electrical converter for converting compensated first optical signal into a first electrical signal;
    a second optical-electrical converter for converting compensated second optical signal into a second electrical signal;
    a first error detector for detecting a signal error of the first electrical signal;
    a second error detector for detecting a signal error of the second electrical signal; and
    a dispersion compensation control unit connected to the first variable dispersion compensation unit, the second variable dispersion compensation unit, the first error detector, and the second error detector, the dispersion compensation control unit controlling dispersion compensation amounts of the first and second variable dispersion compensation units, based on the detection result of the first or second error detector,
    wherein, upon detection of a signal error in the first electrical signal by the first error detector, said dispersion compensation control unit controls the first variable dispersion compensation unit to change from a first compensation amount which is a first predetermined amount, to a third compensation amount to which the dispersion amount of one-half of the wavelength dispersion tolerance range for the first optical-electrical converter differs from the first compensation amount, and
    wherein, upon detection of a signal error recovery in the first electrical signal by the first error detector, said dispersion compensation control unit calculates a change in the dispersion control amount from the occurrence of error to the recovery from error, and controls the second variable dispersion compensation unit other than that in which the error occurred to change from a second compensation amount which is a second predetermined amount, to a fourth compensation amount to which the dispersion mount of the change differs from the second compensation amount.

2. The optical transmission equipment according to claim 1,
    wherein the first error detector and the second error detector enable error correction.

3. A method for controlling optical transmission equipment, comprising the steps of:
    demultiplexing a transmitted wavelength-multiplexed optical signal at least to a first optical signal of a first wavelength and to a second optical signal of a second wavelength;

dispersion compensating the wavelength-demultiplexed first and second optical signals;

converting first and second optical signals into first and second electrical signals;

detecting a signal error in first and second electrical signals;

upon detection of a signal error in the first electrical signal, changing a first compensation amount which is a first predetermined amount, for the first optical signal to a third compensation amount to which the dispersion amount of one-half of the wavelength dispersion tolerance range for the first optical-electrical converter differs from the first compensation amount, upon detection of a signal error recovery in the first electrical signal by the first error detector, calculating a change in the dispersion control amount from the occurrence of error to the recovery of error, and changing a second compensation amount other than that in which the error occurred, which is a second predetermined amount for the second optical signal to a fourth compensation amount to which the dispersion amount of the change differs from the second compensation amount.

\* \* \* \* \*